US012523793B2

(12) United States Patent
Zhang et al.

(10) Patent No.: US 12,523,793 B2
(45) Date of Patent: Jan. 13, 2026

(54) METHODS AND SYSTEMS TO IDENTIFY FORMATIONS WITH MINIMUM CLAY RELATED NATURAL GAMMA RAYS (71) Applicants: Schlumberger Technology Corporation, Sugar Land, TX (US); Saudi Arabian Oil Company, Dhahran (SA)

(72) Inventors: Ping Zhang, Albany, CA (US); Shouxiang Ma, Dhahran (SA); Wael Abdallah, Dhahran (SA); Chengbing Liu, Dhahran (SA)

(73) Assignees: Schlumberger Technology Corporation, Sugar Land, TX (US); Saudi Arabian Oil Company, Dhahran (SA)

( * ) Notice: Subject to any disclaimer, the term of this patent is extended or adjusted under 35 U.S.C. 154(b) by 307 days.

(21) Appl. No.: 18/247,086

(22) PCT Filed: Apr. 29, 2021

(86) PCT No.: PCT/US2021/029860
§ 371 (c)(1),
(2) Date: Mar. 29, 2023

(87) PCT Pub. No.: WO2022/071998
PCT Pub. Date: Apr. 7, 2022

(65) Prior Publication Data
US 2023/0375741 A1 Nov. 23, 2023

Related U.S. Application Data (60) Provisional application No. 63/086,828, filed on Oct. 2, 2020.

(51) Int. Cl.
*G01V 5/06* (2006.01)
*G01N 27/22* (2006.01)
(Continued)

(52) U.S. Cl.
CPC ............. *G01V 5/06* (2013.01); *G01N 27/221* (2013.01); *G01N 33/24* (2013.01); *G01V 3/28* (2013.01); *G06F 18/241* (2023.01)

(58) Field of Classification Search
CPC ...... G01V 5/06; G06F 18/241; G01N 27/221; G01N 33/24
See application file for complete search history.

(56) References Cited

U.S. PATENT DOCUMENTS 4,703,277 A 10/1987 Kenyon
10,036,826 B2 * 7/2018 Thiel .................. G01V 3/20
(Continued)

FOREIGN PATENT DOCUMENTS

WO 2009006332 A2 1/2009

OTHER PUBLICATIONS

International Search Report and Written Opinion issued in the PCT Application PCT/US2021/029860, dated Jul. 27, 2021 (8 pages).
Heslop, A., 1974, Gamma-ray log response of shaly sandstones. Trans. SPWLA 15th Annual Logging Symposium, paper M, McAllen, Texas, Jun. 2-5, 1974 (19 pages).
Serra et al., 1980, Theory, interpretation and practical applications of natural gamma ray spectroscopy. Trans SPWLA 21st Annual Logging Symposium, paper Q. (30 pages).
(Continued)

Primary Examiner — Casey Bryant (57) ABSTRACT

The disclosure relates to methods and systems for identifying formations that are clay-free or with minimal amount of clays, which have high hydrocarbon potential, by using both low frequency permittivity measurements (e.g., low-frequency permittivity measurements) and natural gamma ray flux measurements.

20 Claims, 9 Drawing Sheets (51) Int. Cl.
*G01N 33/24* (2006.01)
*G01V 3/28* (2006.01)
*G06F 18/241* (2023.01)

(56) References Cited

U.S. PATENT DOCUMENTS

| | | | |
|---|---|---|---|
| 2004/0032257 A1 | 2/2004 | Freedman | |
| 2015/0054512 A1 | 2/2015 | DiFoggio | |
| 2016/0187521 A1 | 6/2016 | Homan et al. | |
| 2021/0123877 A1* | 4/2021 | Abdallah | G01N 33/24 |

OTHER PUBLICATIONS

Quierin et al., 1982, Combined natural gamma spectral/litho-density measurement applied to complex lithologies, 57th SPE Annual Technical Conference and Exhibition, paper SPE 11143 (14 pages).
Hassan et al., 1976 "Fundamentals of differential gamma ray log—interpretation technique—," Paper H, Transactions SPWLA 17th Annual Logging Symposium, Jun. 9-12, 1976 (18 pages).
Leroy et al., 2004, A triple layer model of the surface electrochemical properties of clay minerals: Journal of Colloid and Interface Science, 270, 371-380.
International Preliminary Report on Patentability issued in the PCT Application No. PCT/US2021/029860 dated Apr. 13, 2023, 5 pages.

\* cited by examiner

METHODS AND SYSTEMS TO IDENTIFY FORMATIONS WITH MINIMUM CLAY RELATED NATURAL GAMMA RAYS

CROSS-REFERENCE TO RELATED APPLICATION(S)

The present disclosure is a National Stage of International Application No. PCT/US2021/029860, filed Apr. 29, 2021, which claims priority from U.S. Provisional Patent Appl. No. 63/086,828, filed on Oct. 2, 2020, herein incorporated by reference in their entirety.

FIELD

The subject disclosure relates to evaluation of subterranean formations.

BACKGROUND

Gammy ray (GR) logging tools have long been used to distinguish between shales and non-shales in subterranean formations. Early GR logging tools measured only the total gamma ray flux emanating from the formation rock, which suffers non-uniqueness interpretation. To overcome this issue, spectral gamma ray (SGR) logging tools were developed. The SGR logging tools employ the same basic type of detection system as the GR logging tools, but instead of using a broader energy spectrum for detection, the gamma rays are analyzed into several energy bins, which permits the determination of the mass concentration of certain elements including potassium (K), thorium (Th) and uranium (U).

Other logging tools have also been used, though qualitatively, together with GR or SGR logging tools to further refine interpretation. For example, it is common for a spontaneous potential (SP) logging tool, nuclear magnetic resonance (NMR) logging tool, and/or neutron and density logging tool to be used together with the GR or SGR logging tool to further refine interpretation.

SUMMARY

In embodiments, methods and systems are provided for identifying formation rock that is clay-free or with a minimal amount of clay. The methods and systems involve collecting or obtaining electromagnetic measurement data that results from interaction of electrical signals with a sample of the formation, and processing the electromagnetic measurement data to determine data representing permittivity of the sample of the formation. The data representing permittivity of the sample of the formation can be used to determine first data representing total gamma ray flux emanating from the sample of the formation.

In embodiments, the first data representing total gamma ray flux emanating from the sample of the formation can be based on data representing at least one clay type volume fraction contained in the sample of the formation and data representing total gamma ray flux for at least one clay type contained in the sample of the formation.

In embodiments, the first data representing total gamma ray flux emanating from the sample of the formation e.g. clays contained in the sample is calculated according to an equation of the form $$EM\_GR = \frac{\sum_{i=1}^{n} V_{cl,i} GR_i}{\sum_{i=1}^{n} V_{cl,i}},$$

where i ranges from 1 to n representing the clay types contained in the sample of the formation, $V_{cl,i}$ represent volume fraction of each clay type i, and $GR_i$ for each clay type i represents total gamma ray flux for the clay type i.

In embodiments, the data representing total gamma ray flux for the at least one clay type contained in the sample of the formation can be obtained through nuclear particles modeling.

In embodiments, the methods and systems can further involve identifying the at least one clay type contained in the sample of the formation from the data representing permittivity of the sample of the formation, and deriving the data representing at least one clay type volume fraction contained in the sample of the formation from the data representing permittivity of the sample of the formation.

In embodiments, the data representing permittivity of the sample of the formation at a predefined low frequency (e.g., 1 MHz and below) can be supplied as input to at least one correlation model that outputs data identifying at least one clay type contained in the sample of the formation as well as data representing a corresponding clay type volume fraction contained in the sample of the formation.

In other embodiments, feature data can be extracted from data representing permittivity of the sample of the formation at varying frequencies, and such feature data can be supplied as input to at least one correlation model that outputs data identifying at least one clay type contained in the sample of the formation as well as data representing a corresponding clay type volume fraction contained in the sample of the formation.

In embodiments, the methods and systems can further involve collecting or obtaining second data representing total gamma ray flux detected from the sample of the formation, and using the first data representing total gamma ray flux emanating from the sample of the formation and the second data representing total gamma ray flux detected from the sample of the formation to selectively classify the sample of the formation as belonging to one of a plurality of different types of formation rock.

In embodiments, the plurality of different types of formation rock include clean formation rock with no shale or clay, formation rock containing shale or clay, and formation rock with no shale or clay or minimal shale or clay but with one or more elemental components common to shale or clay. In the case that the sample of the formation is selectively classified as formation rock with no shale or clay or minimal shale or clay but with one or more elemental components common to shale or clay, the first data representing total gamma ray flux emanating from the sample can be proportional to the amount of clays existing in the sample of the formation.

In embodiments, the operations can be repeated for a plurality of samples of the formation at varying depth to generate and display a log of first data representing total gamma ray flux emanating from the formation at varying depth and second data representing total gamma ray flux detected from the formation at varying depth.

In embodiments, the methods and systems can further involve calculating a difference value between the first data representing total gamma ray flux emanating from the sample of the formation and the second data representing total gamma ray flux detected from the sample of the formation, and using the difference value to selectively classify the sample of the formation as belonging to formation rock with no shale or minimal shale but with one or more elemental components common to shale.

In embodiments, the operations can be repeated for a plurality of samples of the formation at varying depth to generate and display a log of first data representing total gamma ray flux emanating from the formation at varying depth, second data representing total gamma ray flux detected from the formation at varying depth, and difference values between the first data and the second data at varying depth.

In embodiments, the electromagnetic measurement data can be measured by operation of a downhole logging tool, and the sample of the formation can be formation rock that is disposed adjacent the downhole logging tool during such measurement.

In other embodiments, the electromagnetic measurement data can be measured by operation of a laboratory apparatus or other tool, and the sample of the formation can be a rock core or plug or other rock sample obtained from the formation.

In embodiments, the second data representing total gamma ray flux detected from the sample of the formation can be measured by operation of a downhole logging tool, and the sample of the formation can be formation rock that is disposed adjacent the downhole logging tool during such measurement.

In other embodiments, the second data representing total gamma ray flux detected from the sample of the formation can be measured by operation of a laboratory apparatus or other tool, and the sample of the formation can be a rock core or plug or other rock sample obtained from the formation.

In embodiments, data representing permittivity of the rock samples of known clay type and known clay type volume fraction can be used to generate at least one correlation model.

In embodiments, the formation comprises sedimentary rock.

In embodiments, the method can be performed by a processor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Gamma ray (GR) logging devices have been used traditionally for correlating zones of a subterranean formation in different wells that traverse the formation, for identification of lithology, and for determining a rough estimate of total shale/clay volume ($V_{cl}$) at different zones of the formation. A zone containing shale or shaly rock can be readily identified in wells that are separated by large distance and traverse the zone from their characteristic GR flux measured by a Gamma ray (GR) logging device. Typically, the measured GR flux is represented in American Petroleum Institute (API) units. The main source of the GR flux measured by a gamma ray (GR) logging device comes from three naturally occurring radioactive elements: potassium (K), thorium (Th) and uranium (U). These elements are commonly found in sedimentary rocks and have very long half-lives. One of the difficulties in the interpretation of the GR flux measured by a GR logging device is lack of uniqueness. For example, there can be "hot" zones of carbonate rock and/or clastic rock which may contain no clay minerals (i.e., clay free) or a minimal amount of clay minerals but show a very high GR flux as measured by a GR logging device due to the presence of one or more of the naturally occurring radioactive elements: potassium (K), thorium (Th) and uranium (U) in the rock. Typically, the very high GR flux of such "hot" zone is due to the presence of uranium (U). In another example, there can be "hot" zones of sandstone rock which may contain no clay minerals (i.e., clay free) or a minimal amount of clay minerals but show a very high GR flux as measured by a GR logging device due to the presence of one or more of the naturally occurring radioactive elements: potassium (K), thorium (Th) and uranium (U) in the rock. Typically, the very high GR flux of such "hot" zone is due to the presence of K-Feldspar that contains potassium (K).

Many shale-type subterranean formations (such as shaly sands) show a high GR flux as measured by a GR logging device due to the presence of uranium (U) in the shale-type formation rock. The high GR flux of the shale-type formation rock can be difficult to distinguish from the high GR flux of any hot zone as measured by a GR logging device.

Without additional information from other measurements, the measurements or log of the GR logging device alone cannot distinguish a hot zone that is essentially clay-free or contains a minimum amount of clay materials from shale-type formation rock. However, the hot zone can possibly hold hydrocarbons (oil and/or gas) and misidentification of the "hot" zone as shale-type formation rock can result in missing a potential hydrocarbon reserve.

The primary use of the measurements of GR flux obtained by a GR logging device is to estimate the shaliness of formation rock by calculating volume fraction of clay/shale ($V_{cl}$). The traditional approach is to scan the GR log for a minimum GR flux value ($GR_{min}$) and a maximum GR flux value ($GR_{max}$). The measured value $GR_{min}$ is assumed to be in a clean zone (i.e., clay fee or 0% shale/clay), and the measured value $GR_{max}$ is assumed to be in a shale zone (i.e., 100% shale or $P_{CL-SH}$ % clay). Then the GR flux value (typically in API units) measured at any other zone in the well ($GR_{log}$) may be converted to an estimate for clay volume ($V_{cl}$) at that zone by using a model such as linear scaling as follows:

$$V_{cl} = P_{CL-SH} \frac{GR_{log} - GR_{min}}{GR_{max} - GR_{min}} \qquad \text{Eqn. (1)}$$

where $P_{CL-SH}$ is the maximum percentage amount (or volume fraction) of clay in the shale zone (with the remaining percentage amount or volume fraction being other fine-grained minerals such as silt).

In embodiments, $P_{CL-SH}$ can be a maximum percentage amount in the range 55-75% or a maximum volume fraction in the range 0.55-0.75 v/v. Alternatively, other models can be used to convert the measured GR flux value $GR_{log}$ for a zone to an estimate for clay volume ($V_{cl}$) at that zone.

The estimation of clay volume ($V_{cl}$) from a GR flux measurement is appropriate for shaly zones which contain the same proportions of clay minerals as those zones used for the determination of the measured GR flux value ($GR_{min}$) and the measured GR flux value ($GR_{max}$). In addition, based on the study by Hassan et al., the correlation between clay minerals and GR producing elemental concentrations was found to be higher for potassium (K) and thorium (Th), while that for uranium (U) was negligible. See Hassan et al., "Fundamentals of differential gamma ray log-interpretation techniques," Paper H, Transactions SPWLA 17th Annual Logging Symposium, 1976. The correlation between clay minerals and Th was the highest, because K can also be associated with other components of the shale, such as feldspars. In addition, the GR measurement is often contaminated by drilling fluid that contains potassium (K) and thus requires a corresponding K mud correction. All these factors determine that the GR measurement may not be a reliable indicator for clay minerals. In fact, it may give misleading results. For example, a "hot" sand zone may contain U and K elements, which will result in high GR readings. If this "hot" sand zone is misidentified as a shaly-type formation rock, a potential hydrocarbon reserve can be missed.

In a subterranean formation, dielectric permittivity is mainly caused by induced polarization (IP). Under an external electromagnetic (EM) field, both electrical conduction (due to charge carries) and induced polarization (due to ions) co-exist, and the measured EM field is influenced by both effects. Electrical conduction describes the movement of the charge carried under the influence of the external EM field. This is a well-understood phenomenon and can be described by Ohm's law.

Induced polarization (IP) can be observed in porous media containing clay materials (such as shaly sands). Clay minerals can be grouped, based on molecular structure and composition, into four commonly encountered and representative clay types: kaolinite, illite, chlorite and smectite. Although each clay type impacts formation conductivity differently, the fundamental mechanism is similar. When the surface of a clay mineral grain is exposed to electrolytes, it acquires charges due to ionic adsorption, protonation/deprotonation of the hydroxyl groups, and dissociation of other potentially active surface groups and becomes conductive. In the presence of an external electromagnetic (EM) field, these surface charges form electric dipoles cause induced polarization (IP) effects. See Leroy et al., "A triple layer model of the surface electrochemical properties of clay minerals", Journal of Colloid and Interface Science, 270, 371-380, 2004. The strength of the IP effects is regulated by permittivity of the porous media (formation rock).

Figure 1:
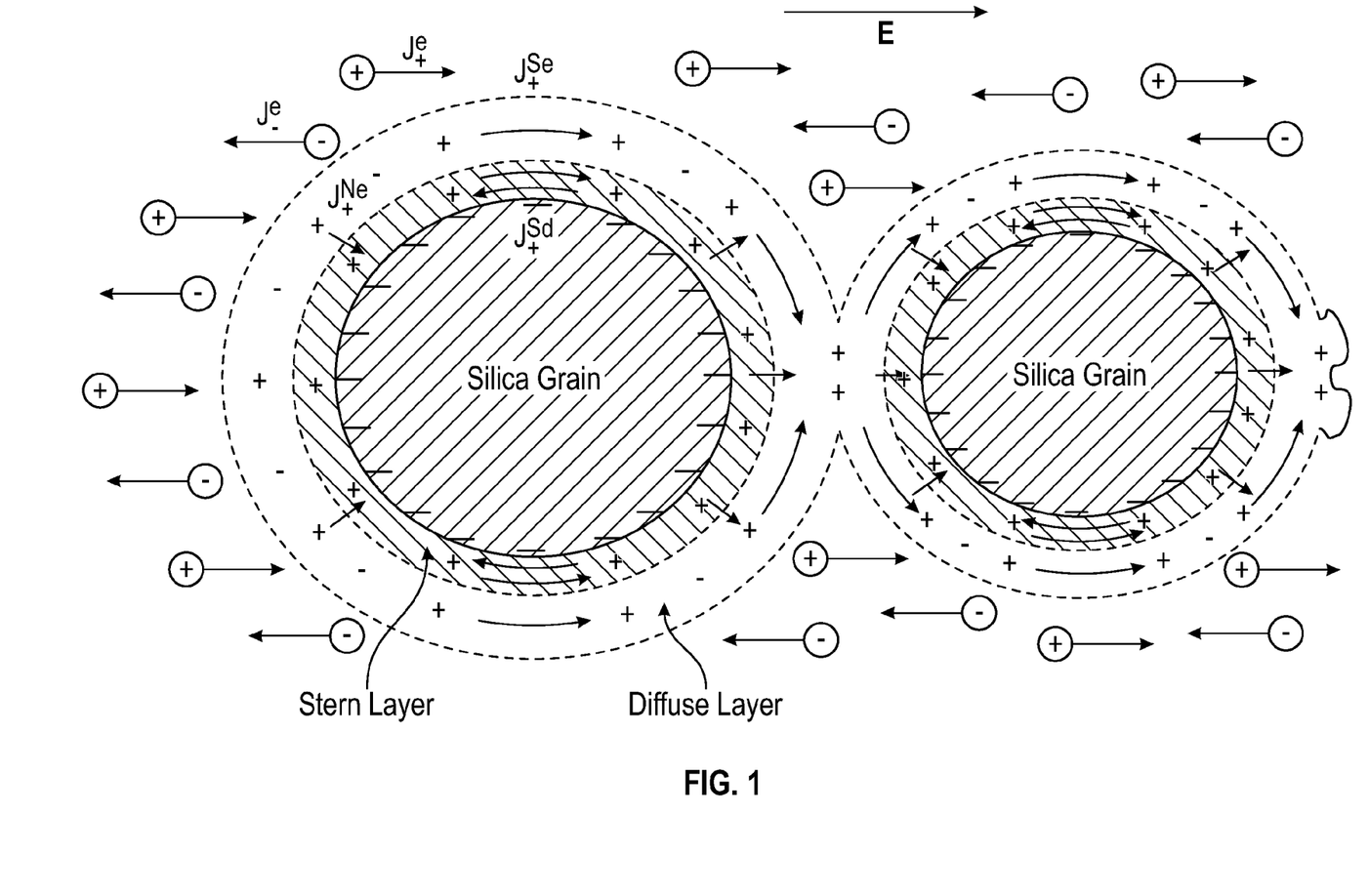
FIG. 1 depicts an interfacial polarization of clay minerals with an electrical double layer.

The polarization of clay particles is mostly due to charge accumulation and movements at host-inclusion interfaces. The most common theory to describe this induced polarization is the electrical double layer shown in FIG. 1. At the surface of the clay particles, both Stern and diffuse layers are formed due to charge absorptions and movements. In the presence of an externally applied electric field, the double layer develops a counter ion cloud and diffused-charge distribution around host-inclusion interfaces. Dynamics of accumulation/depletion of charge concentrations around host-inclusion interfaces influence the magnitude and phase of the electromagnetic response of a porous media such as reservoir formation rock containing clay minerals.

The effect of IP can be widely observed from electromagnetic (EM) surveys conducted on porous media. The commonly measured downhole resistivity logs are also impacted by IP effects; thus, resistivity logs can be used to estimate dielectric permittivity. More specifically, in a subterranean formation containing porous media (reservoir formation rock) and formation fluids (water, oil, and/or gas), application of an externally applied electric field results in electric conduction (migration of charge) and interfacial polarization (IP). The conduction current and IP effects can be characterized by formation conductivity and dielectric permittivity, which can be described by a complex conductivity:

$$\sigma = \sigma^R + i\omega\varepsilon_0\varepsilon_r \qquad \text{Eqn. (2)}$$

where $\sigma^R$ is the in-phase component, and $i\omega\varepsilon_0\varepsilon_r$ is the quadrature component of the total conductivity, respectively; $\omega$ is frequency; $\varepsilon_0$ is the permittivity of vacuum ($8.854 \times 10^{-12}$) and $\varepsilon_r$ is the relative permittivity.

For porous media (reservoir formation rock) containing clay minerals, the relative permittivity $\varepsilon_r$ depends on clay type and volume of each clay type. A pixel inversion-based processing method can be used to simultaneous determine the conductivity $\sigma^R$ (or resistivity) and relative permittivity $\varepsilon_r$, of the formation, by measured R- and X-components of resistivity logs obtained from induction-type logging tools as well as phase shift and attenuation data obtained from logging-while-drilling (LWD) tools. An example of pixel inversion-based processing method is described in detail in U.S. Pat. No. 10,036,826, commonly assigned to assignee of the subject disclosure. In this example, for pixel inversion-based processing method, there is no assumption as to a maximal number of layers (an assumption usually present in model-based inversion approaches). Furthermore, instead of inverting for distance to boundaries layer thicknesses, bed resistivities, and dip, the example pixel inversion-based processing method inverts for distribution of resistivities using predefined thin layers referred to as "pixels." The boundary positions are inferred from changes in resistivities. In other embodiments, model-based inversion processing methodology can be used. The inversion process can employ a model based on Maxwell's equations to solve for the data characterizing resistivity (or conductivity) and complex permittivity (or dielectric constant) of the formation. The stopping criteria for the inversion process can also be based on a cost function. The cost function may include one or more parameters related to physical properties of the formation, such as resistivity (or conductivity), permittivity (or dielectric constant), and position within the formation. For example, the cost function may include a misfit term, an entropy term, and a smoothing term. In some embodiments, one or more of the terms (e.g., the misfit term, the entropy term, and the smoothing term) may be parameterized based on the resistivity (or conductivity) and/or permittivity (or dielectric constant) as defined by the model.

In embodiments, methods and systems are disclosed for identifying or classifying particular formation rock (referred to herein as "hot" formation rock or "hot" zone) that is clay-free or with minimal amount of clay but with one or more elemental components common to clay and thus show a relatively high GR flux. The hot formation rock can be porous sedimentary rock (such as dolomite or sand layers) that has potential for holding hydrocarbons (such as oil and/or gas). The methods and systems use both a GR measurement of a formation rock sample (or formation zone) and at least one permittivity measurement of the same formation rock sample (or the same formation zone) to identify or classify the formation rock sample (or the formation zone) as hot formation rock or hot zone. In embodiments, the methods and systems can distinguish the hot formation rock or hot zone from shale or shale zone that contains clay material and also shows a relatively high GR flux.

Figure 2A:
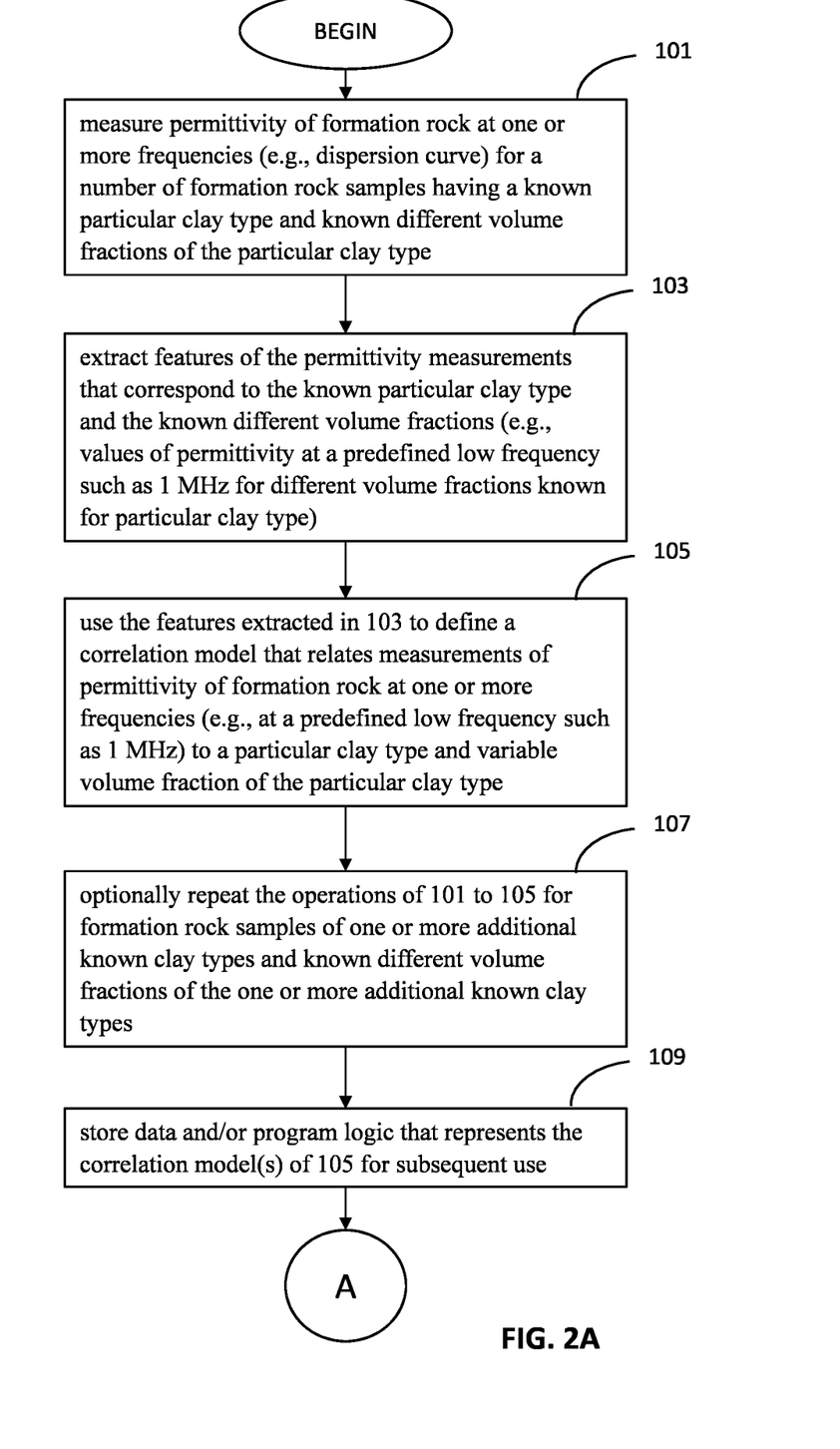
FIGS. 2A-2C, collectively, is a flow chart that illustrates a workflow according to the present disclosure.
Figure 2B:
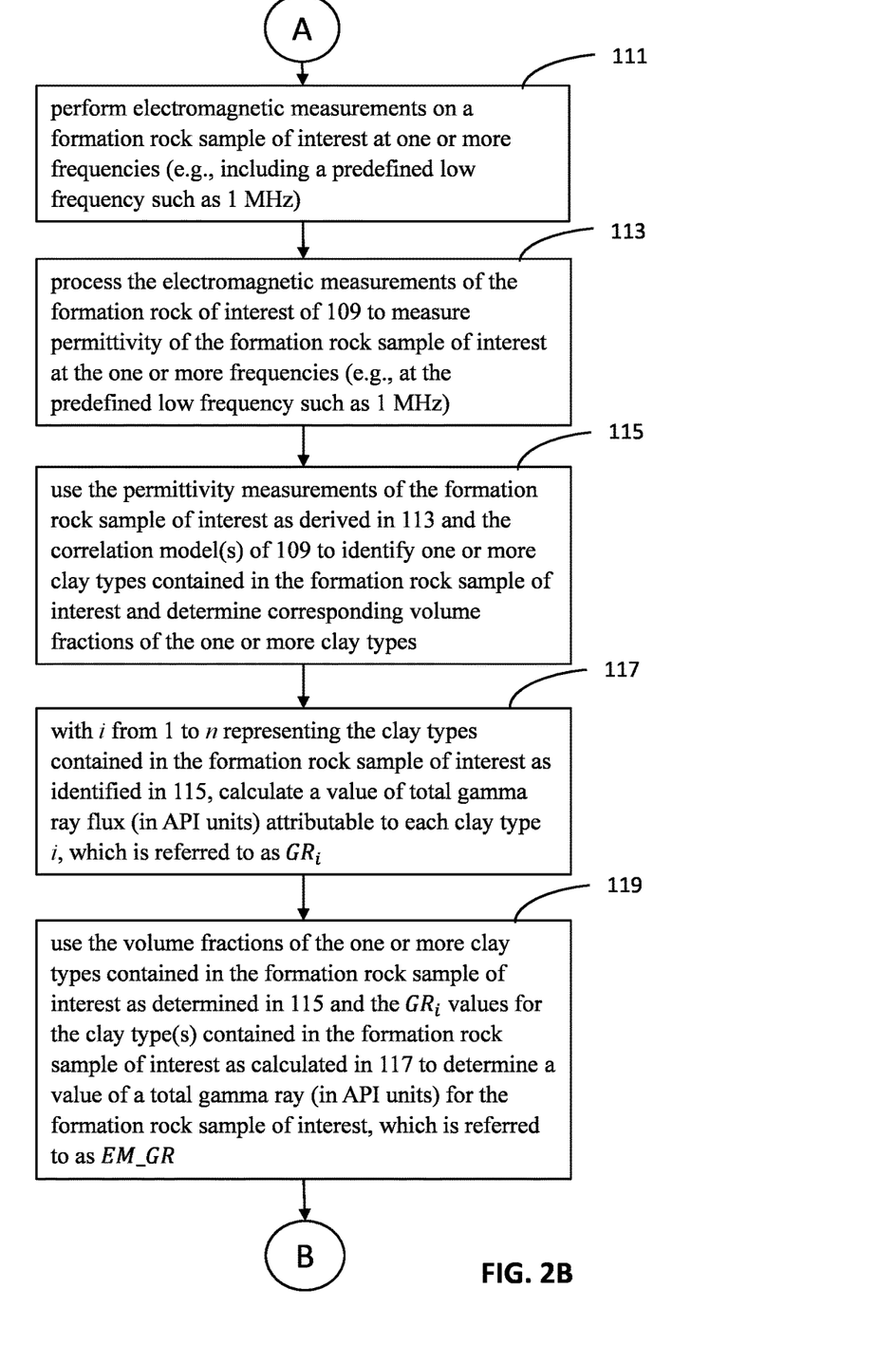
Figure 2C:
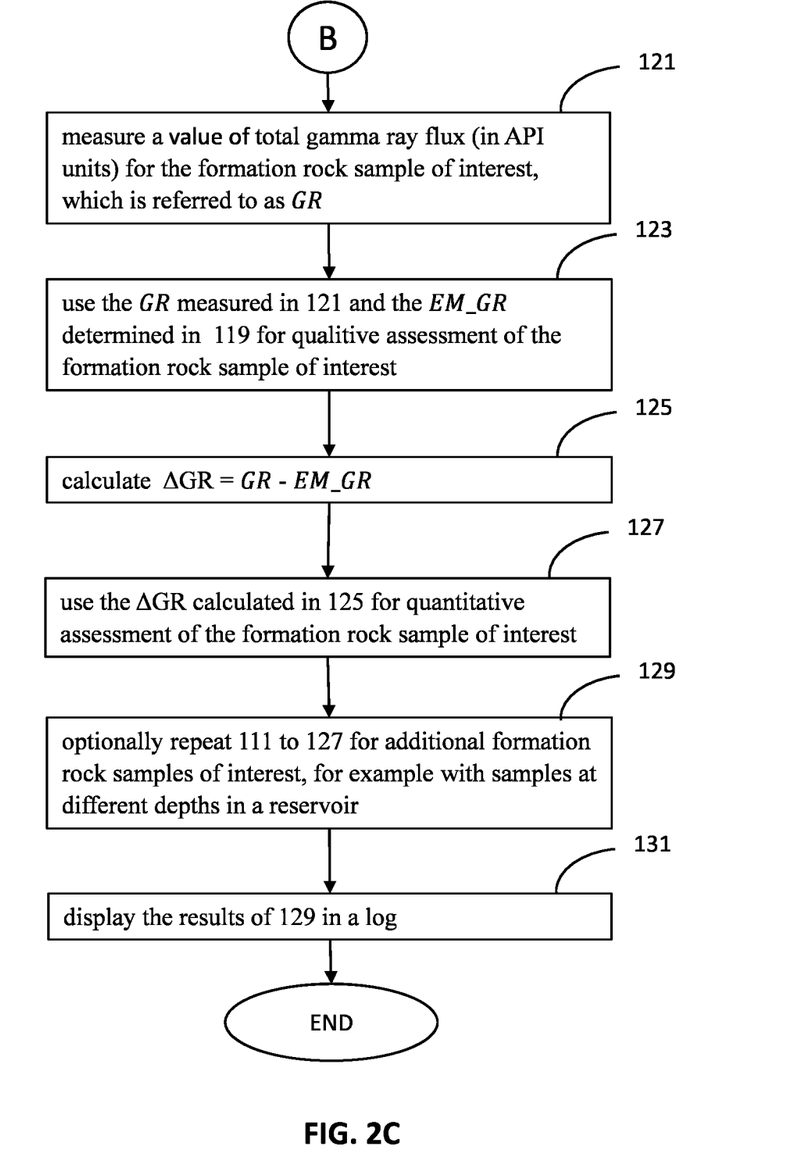

FIGS. 2A-2C, collectively, illustrate a workflow for identifying or classifying a hot formation rock or hot zone that is clay-free or with minimal amount of clay but shows a high GR signature (flux).

Figure 3:
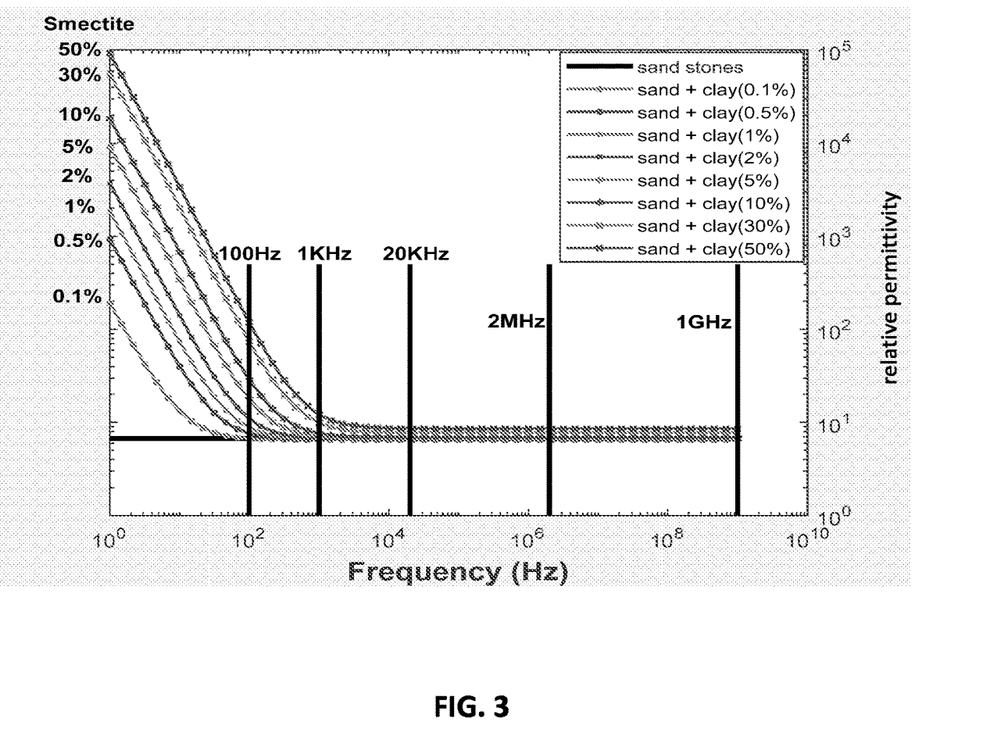
FIG. 3 is a plot of permittivity dispersion curves for shaly sands of particular clay type (smectite) with different volume fractions of the particular clay type (smectite) ranging from 0.1%,). 5%, 1%, 2%, 5%, 10% 30% and 50%. The porosity is 30% and water saturation is 20% for all of the shaly sands at these different volume fractions.

The workflow begins in block 101 by measuring permittivity data that represents permittivity (e.g., relative permittivity) of formation rock at one or more frequencies for a number of formation rock samples having a known particular clay type (i.e., one of kaolinite, illite, chlorite or smectite) and known different volume fractions of the particular clay type. In embodiments, the formation rock samples can be rock cores or plugs or other rock samples obtained from one or more subterranean formations and having the known particular clay type and the known different volume fractions of the particular clay type. The permittivity measurements can be carried out by laboratory apparatus or other tools well known in the art. In embodiments, the permittivity measurements of 101 can be carried out over a range of different frequencies to measure a dispersion curve of permittivity for a number of formation rock samples having a known particular clay type (i.e., one of kaolinite, illite, chlorite or smectite) and known different volume fractions of the particular clay type. Examples of such permittivity dispersion curves are shown in FIG. 3 and discussed below in more detail.

In block 103, the permittivity data of 101 is analyzed to extract features (feature data) that correspond to the known particular clay type and volume fractions. For example, the feature data can represent values of permittivity at a predefined low frequency, such as 1 MHz or below, for different volume fractions of the known particular clay type. In other examples, the feature data can represent other values or characteristics of the permittivity values of the formation rock sample of interest over a range of frequencies where such values or characteristics are sensitive to clay type and clay volume fraction.

In block 105, the feature data extracted in 103 is used to define a correlation model that relates measurements of permittivity of formation rock at one or more frequencies (e.g., at a predefined low frequency such as 1 MHz or below) to a particular clay type and variable volume fraction of the particular clay type.

In block 107, the operations of 101 to 105 are optionally repeated for formation rock samples of one or more additional known clay types and known different volume fractions of the one or more additional known clay types.

In block 109, data and/or program logic that represents the correlation model(s) of 105 can be stored in memory (electronic storage) for subsequent use.

FIG. 3 shows permittivity dispersion curves for quartz mixed with smectite of different volume fractions. For comparison, the permittivity dispersion curve for clean sandstone (pure quartz) is also plotted. All the curves have a water saturation level of 20% or oil saturation of 80%. It is observed that while the clean sandstone has no dispersion effect, the shaly sandstone shows strong dispersion effects. Certain features of dispersion curves at low frequency, such as the permittivity measurements at 1 Hz, strongly depends on the volume fractions of clays. Even with 1% or less clay content, the permittivity dispersion curves show significant differences from the clean sandstone, indicating it is a very sensitive technique for detecting small amounts of clays for applications of porous media characterization. In addition, the features of the permittivity dispersion curves that are sensitive to clay volume fraction (e.g., the permittivity measurements at 1 Hz) are easily differentiable for different clay volume fractions.

Several observations can be made from FIG. 3. The first observation is that that the features of the permittivity dispersion curves that are sensitive to clay volume fraction (e.g., the permittivity measurements at 1 Hz) strongly depend on clay volume fractions. Even with 1% or less clay content, the permittivity dispersion curve shows a significant difference from that of clean sandstone. In addition, the features of the permittivity dispersion curves that are sensitive to clay volume fraction (e.g., the permittivity measurements at 1 Hz) are easily differentiable for different clay volume fractions. The second observation is that the low frequency permittivity measurements (e.g., at a predefined low frequency such as 1 MHz) can be used to define one or more correlation models that relate measurements of permittivity of formation rock to clay type and variable volume fraction of clay type, and such correlation model(s) can be used to detect the presence of clay minerals and precisely quantify its volume fractions ($V_{cl}$).

Turning back to the workflow of FIGS. 2A-2C, in block 111 of FIG. 2B, electromagnetic measurements are performed on a formation rock sample of interest with unknown clay type and unknown clay volume fraction. The electromagnetic measurements can be performed on the formation rock sample of interest at one more frequencies (e.g., at a predefined low frequency such as 1 MHz). Such measurements can be performed by an electromagnetic logging tool deployed downhole in a well (or wellbore). The electromagnetic logging tool can be an induction-type logging tool (e.g., FIGS. 5A and 5B) that measures R- and X-components of a resistivity log, or possibly a logging-while-drilling (LWD) tool that obtains phase shift and attenuation data. In this case, the formation rock sample of interest can be formation rock that is disposed adjacent the electromagnetic logging tool during such measurements. In other embodiments, the formation rock sample of interest can be a rock core or plug or other rock sample obtained from a formation, and the electromagnetic measurements can be carried out by laboratory apparatus or other tools well known in the art.

In block 113, the electromagnetic measurements of the formation rock sample of interest of 111 can be processed to derive permittivity data that represents a value of permittivity of the formation rock sample of interest at the one more frequencies (e.g., at a predefined low frequency such as 1 MHz). For example, inversion-based processing can be used to determine the relative permittivity of a formation rock sample of interest as is well known and summarized above.

In block 115, the permittivity data of the formation rock sample of interest as derived in 113 and the correlation model(s) of 109 can be used to identify one or more clay types (i.e., one or more of kaolinite, illite, chlorite or smectite) contained in the formation rock sample of interest and determine corresponding volume fractions of the one or more clay types contained in the formation rock sample of interest. In embodiments, the permittivity data of the formation rock sample of interest at a predefined low frequency (such as 1 MHz) can be supplied as input to the correlation model(s) of 109, which outputs data that identifies one or more clay types contained in the formation rock sample of interest as well as corresponding volume fractions of the one or more clay types contained in the formation rock sample of interest. In other embodiments, features (feature data) can be extracted from the permittivity data of the formation rock sample of interest over a range of frequencies in a manner similar to block 103 and the feature data can be supplied as input to the correlation model(s) of 109, which outputs data that identifies one or more clay types contained in the formation rock sample of interest as well as corresponding volume fractions of the one or more clay types contained in the formation rock sample of interest.

In block 117, with i ranging from 1 to n representing the clay types contained in the formation rock sample of interest as identified in 115, a value of total gamma ray flux (in API units) can be calculated for each clay type i. The total gamma ray flux (in API units) for a given clay type i is referred to herein as $GR_i$. The data value $GR_i$ is a laboratory measured gamma ray response for component i.

In block 119, the volume fractions of the one or more clay types contained in the formation rock sample of interest as determined in 115 and the $GR_i$ values for the clay type(s) contained in the formation rock sample of interest as calculated in 117 can be used to determine a value of a total natural gamma ray (in API units) for the sample of formation rock, which is referred to as EM_GR. In embodiments, the data value EM_GR can be calculated as:

$$\text{EM\_GR} = \frac{\sum_{i=1}^{n} V_{cl,i} GR_i}{\sum_{i=1}^{n} V_{cl,i}}, \qquad \text{Eqn. (3)}$$

where i ranges from 1 to n representing the clay types contained in the formation rock sample of interest as identified in 115, $V_{cl,i}$ represent the volume fraction of each clay type i as determined in 115, and the $GR_i$ values for each clay type i are calculated in 117.

In block 121, a value of total gamma ray flux (in API units) can be measured for the formation rock sample of interest. This data value represents total natural gamma ray flux emanating from the formation rock sample of interest and is referred to herein as GR. Such gamma ray measurement can be performed by a GR logging tool deployed downhole in a well (or wellbore). In this case, the formation rock sample of interest can be formation rock that is disposed adjacent the GR logging tool during such measurements. In other embodiments, the formation rock sample of interest can be a rock core or plug or other rock sample obtained from a subterranean formation, and the gamma ray measurement can be carried out by laboratory apparatus or other tool well known in the art.

In block 123, the GR measured in 121 and the EM_GR determined in 119 can be used for qualitative assessment of the formation rock sample of interest. For example, a human (e.g., geologist or other expert) can interpret the values to identify or classify the formation rock sample of interest in a manner that distinguishes between clean formation rock (no shale or clay), hot formation rock (no shale or clay or very little shale or clay, but with one or more elemental components common to shale or clay), and formation rock containing shale or clay. Specifically, the formation rock sample of interest can be classified as clean formation rock (no shale) if and when both the GR and EM_GR values are relatively low. The formation rock sample of interest can be classified as hot formation rock (no shale or clay or very little shale or clay, but with one or more elemental components common to shale or clay) if and when the GR value is relatively high and the EM_GR value is relatively low. In this case, the EM_GR value will be proportional to the amount of clays existing in the hot formation rock. Finally, the formation rock sample of interest can be classified as formation rock containing shale or clay if and when both the GR and EM_GR values are relatively high. In other embodiments, the formation rock sample of interest can be equated to other classes or categories of formation rock based on the GR and EM_GR values.

In block 125, the difference between the as measured in 121 and the EM_GR determined in 119 can be calculated as:

$$\Delta GR = GR - EM\_GR \qquad \text{Eqn. (4)}$$

In block 127, the data value $\Delta GR$ calculated in 125 can be used for quantitative assessment of the formation rock sample of interest. For example, software logic can process the $\Delta GR$ calculated in 125 to automatically interpret the difference value $\Delta GR$ and classify the formation rock sample of interest in a manner that distinguishes hot formation rock (no shale or clay or very little shale or clay but one or more elemental components common to shale or clay) from clean formation rock (no shale or clay) and formation rock containing shale or clay. Specifically, the formation rock sample of interest can be classified as hot formation rock (no shale or clay or very little shale or clay but with one or more elemental components common to shale or clay) if and when the $\Delta GR$ value is relatively high as compared to the $\Delta GR$ value for clean formation rock (no shale or clay) and formation rock containing shale or clay, which should be at or near zero. Note that the GR value for clean formation rock (no shale or clay) can be calibrated to equal EM_GR for the clean formation rock such that the $\Delta GR$ value for clean formation rock should be at or near zero.

In block 129, the operations of 111 to 127 can be optionally repeated for additional formation rock samples of interest, for example, with samples at different depths in a formation.

Figure 4:
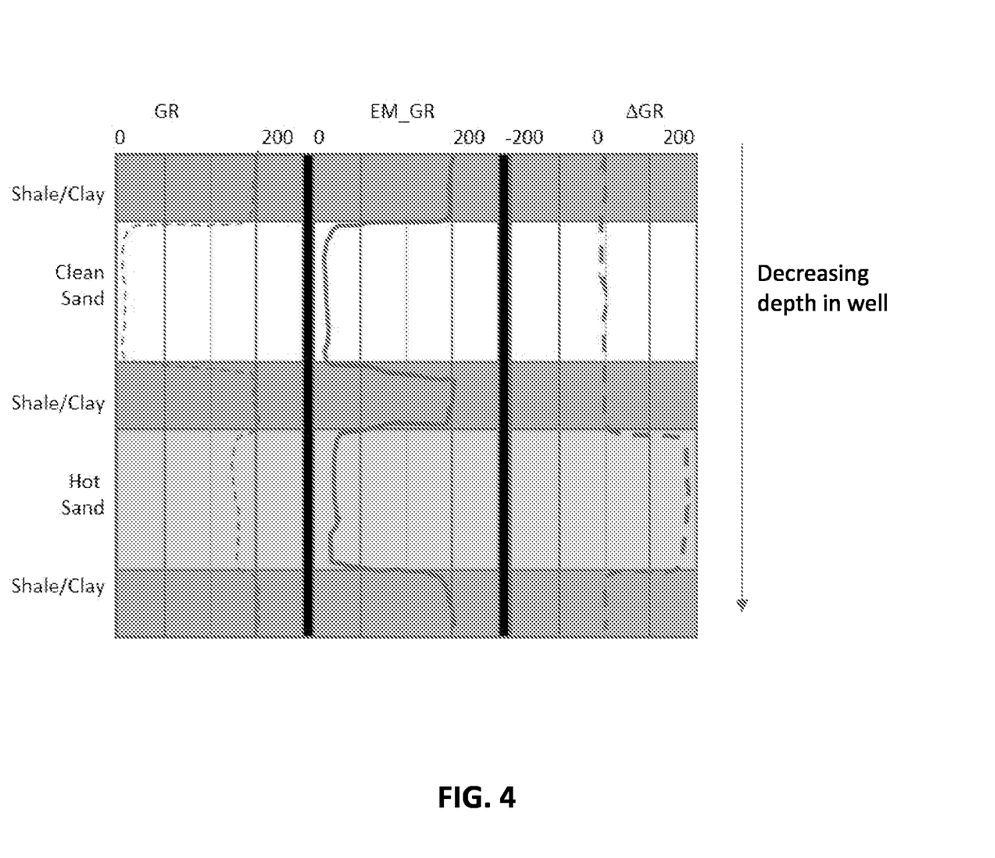
FIG. 4 depicts a log that includes measurements of detected GR flux (labeled "GR"), calculations of EM_GR from low frequency permittivity measurements (labeled "EM_GR"), and the differences between these two (labeled "ΔGR") as a function of varying formation depth, which allows for identification of well zones or intervals of hot formation rock (such as hot sands), which are clay-free or with minimal clay but with one or more elemental components common in clay and thus produce relatively high GR flux measurements.

In block 131, the results of 129 can be displayed in a log. For example, the GR data values, the EM_GR data values and/or the ΔGR data values for the formation rock can be plotted adjacent one another as a function of decreasing depth in a subterranean formation. These data values can be used to classify the formation rock at varying depths as belonging to either clean formation rock (no shale or clay), hot formation rock (no shale or clay or very little shale or clay, but with one or more elemental components common to shale or clay), formation rock containing shale or clay by human interpretation (e.g., geologist or other expert) or software logic as described herein. The classification can then be visually depicted as labels and/or shading/colors displayed as part of the log. An example log is shown in FIG. 4.

It is noted that, depending on the strength of the radio-activity of the non-clay minerals, the GR flux measurement in hot formation rock may be lower or higher than GR reading in the formation rock containing shale/clay.

In embodiments, data analytics can be used to establish relationships or correlations between GR and EM_GR for regional shales and/or shaly sand. These correlations can be useful tools for regional geological studies such as depositional studies as well as diagenesis studies.

In embodiments, the methods and systems of the present disclosure can provide a quantitative estimate of clay volume of formation rock from low frequency electromagnetic (EM) measurements of the formation rock.

In embodiments, the methods and systems of the present disclosure can generate gamma ray logs of formation rock from electromagnetic (EM) measurements of the formation rock.

In embodiments, the methods and systems of the present disclosure can qualitatively differentiate high gamma ray (GR) clay formations from high GR formations with no-clay or a minimal amount of clays (hot formation rock).

In embodiments, the methods and systems of the present disclosure can quantitively differentiate high gamma ray (GR) clay formations from high GR formations with no-clay or a minimal amount of clays (hot formation rock).

In embodiments, the methods and systems of the present disclosure can improve the quality of GR interpretation and provide better formation evaluation so that potential pay zones due to non-clay high GR reading such as the so-called hot formation rock (e.g., hot sand) would not be missed.

In embodiments, the methods and systems of the present disclosure can improve regional geological studies by correlating EM_GR and GR. Embodiments of the subject disclosure will enhance formation evaluation.

It will be appreciated that the workflow as described herein can employ downhole logging tools (such as wireline or logging-while-drilling tools) that are conveyable in a wellbore that traverses the formation rock under investigation, such as the logging tools described below with respect to FIGS. 5A and 5B.

Figure 5A:
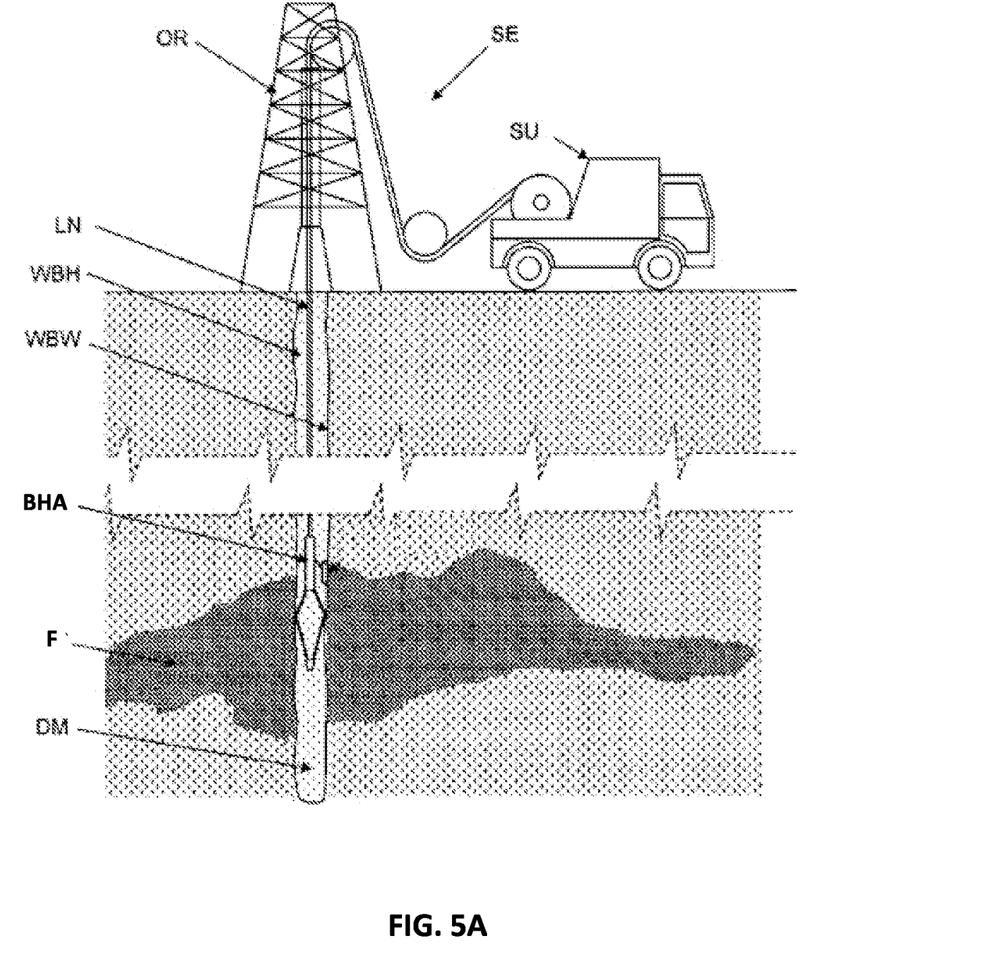
FIG. 5A is a schematic diagram illustrating an example onshore well location.

FIG. 5A is a schematic diagram that illustrates an example onshore well location with surface equipment SE above a hydrocarbon-bearing subterranean formation F after a drilling operation has been carried out. At this stage, i.e. before a casing string is run and before cementing operations are carried out, the wellbore WBH is filled with a fluid mixture DM, which is typically a mixture of drilling fluid and drilling mud. In this example, the surface equipment SE comprises an oil rig OR and a surface unit SU for deploying a bottom hole assembly BHA in the wellbore WB. The surface unit SU may be a vehicle coupled to the BHA by a wireline cable LN. Further, the surface unit SU can include an appropriate device for determining the depth position of the BHA relative to the surface level. The BHA may include a centralizer that is configured to ensure correct axial positioning of the BHA in the wellbore WBH. The BHA can include various tools or sensors and can provide various measurement data related to the hydrocarbon-bearing subterranean formation F and/or the fluid mixture DM. Such measurement data are collected by the sensors or logging tools of the BHA and transmitted to the surface unit SU. The surface unit SU can include appropriate electronic and software arrangements for processing, analyzing, and storing such measurement data.

It should be appreciated that in an alternative embodiment such processing circuitry can be located downhole in or near the BHA itself. Such processing circuitry can be capable of handling all or parts of the processing functionality pertaining to the various measurements and workflows described herein.

Moreover, while FIG. 5A shows a wireline application, it should also be appreciated that the embodiments described herein are equally applicable to logging while drilling applications. That is, there is no need for the BHA to be limited to an application wherein it is attached to a wire or cable controlling its movements. It is possible for the functionality of the BHA to be conveyed by drill pipe, for example to drill pipe above a drill collar and drill bit. This advantageously allows the benefits of the improved techniques described herein to be used during the drilling stage as well.

Figure 5B:
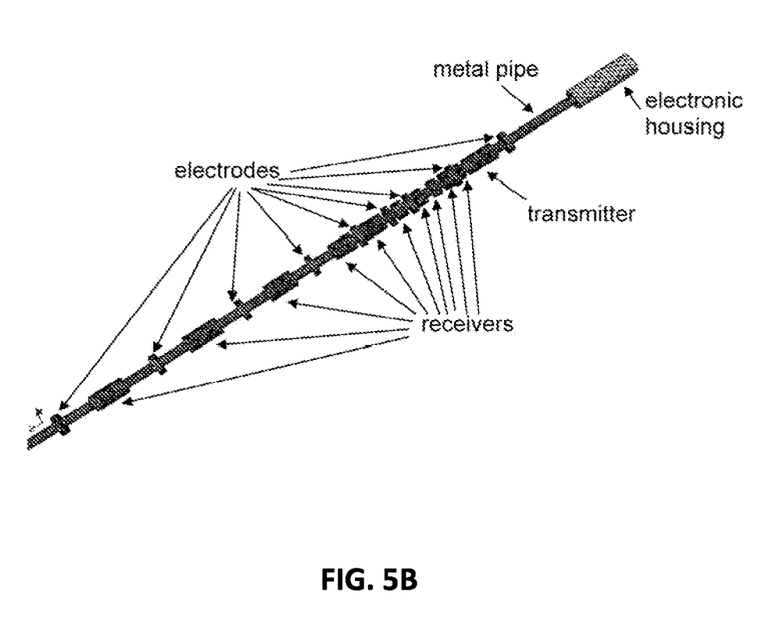
FIG. 5B is a schematic diagram of an induction logging tool.

FIG. 5B is a schematic diagram of an induction logging tool that can be included as part of the BHA and configured to perform the electromagnetic measurements as part of the workflow described herein in order to investigate the subterranean formation F traversed by the wellbore WBH. The induction logging tool includes a metal pipe inside an insulating mandrel which supports mutually orthogonal and collocated transmitter and receiver coils. The tool includes a transmitter with three transmitter coils along with several receivers spaced therefrom. The three transmitter coils are energized by an alternating current. The oscillating magnetic field produced by this arrangement results in the induction of currents in the formations which are nearly proportional to the conductivity of the formations. These currents flow orthogonal to the planes oriented with respect to respective transmitter normals in the X, Y, and Z directions, which are defined by the directions of the dipole moments of each of the three transmitter coils. These currents contribute to the voltage induced in one or more of the receiver coils. The X and R signal components of such voltage signals can be obtained and converted into digital form as X and R signal component data. Such multi-component signal data can be interpreted by inversion processing to determine a log of formation resistivity (or conductivity) and permittivity (or dielectric constant) as well as other useful petrophysical parameters, such as anisotropy, relative dip angles, strike angles, sand and shale content, and water saturation. The electrodes are coupled to the metal pipe to the exterior of the tool and the borehole fluid. These electrodes are positioned above and below the transmitter and receiver antennas as well as in-between the antennas, and function to compensate for tool eccentricity. The electronics housing can include a signal generator and power amplifiers (not shown) to cause alternating currents of selected frequencies to flow through transmitter coils. A processor which controls the operation of the tool and processes acquired data may be part of the electronics housing. The electronics housing can also include communication equipment for communicating the X and R signal component data to a surface processor for follow-on processing as part of the workflow. Alternatively, some or all of the processing and control may be done by the surface processor.

In other embodiments, the induction logging tool can be an array induction logging tool, such as the AIT or Thrubit Induction tools of Schlumberger Technology Corporation. In still other embodiments, the workflow can be based on attenuation and phase shift measurements acquired by a propagation-type downhole tool as a substitute for the R and X signals acquired by the induction logging tool.

In other embodiments, the BHA can also embody a GR logging tool utilizing one or more gamma ray detectors. The GR logging tool can be configured to detect natural gamma ray flux (or natural gamma ray count rate) emanating from the formation rock zone adjacent the GR logging tool and generate data representing such natural gamma ray flux. Examples of such GR logging tools include, without limitation, Ecoscope, Highly Integrated Gamma Neutron Sonde (HGNS), Hostile Environment Telemetry And Gamma Ray Cartridge (HTGC), Scintillation Gamma Ray Tool (SGT), Slim Telemetry And Gamma Ray Cartridge (STGC), Slimxtreme Telemetry And Gamma Ray Cartridge (QTGC), And Combinable Gamma Ray Sonde (CGRS), each of Schlumberger.

Note that the downhole measurements of the workflow can be performed at different depths in the wellbore in order to investigate different parts of the subterranean formation that is traversed by the wellbore, and the processing of the workflow can be repeated for the corresponding downhole measurements at the respective depths in order to accurately characterize the formation rock at the measured depths.

Figure 6:
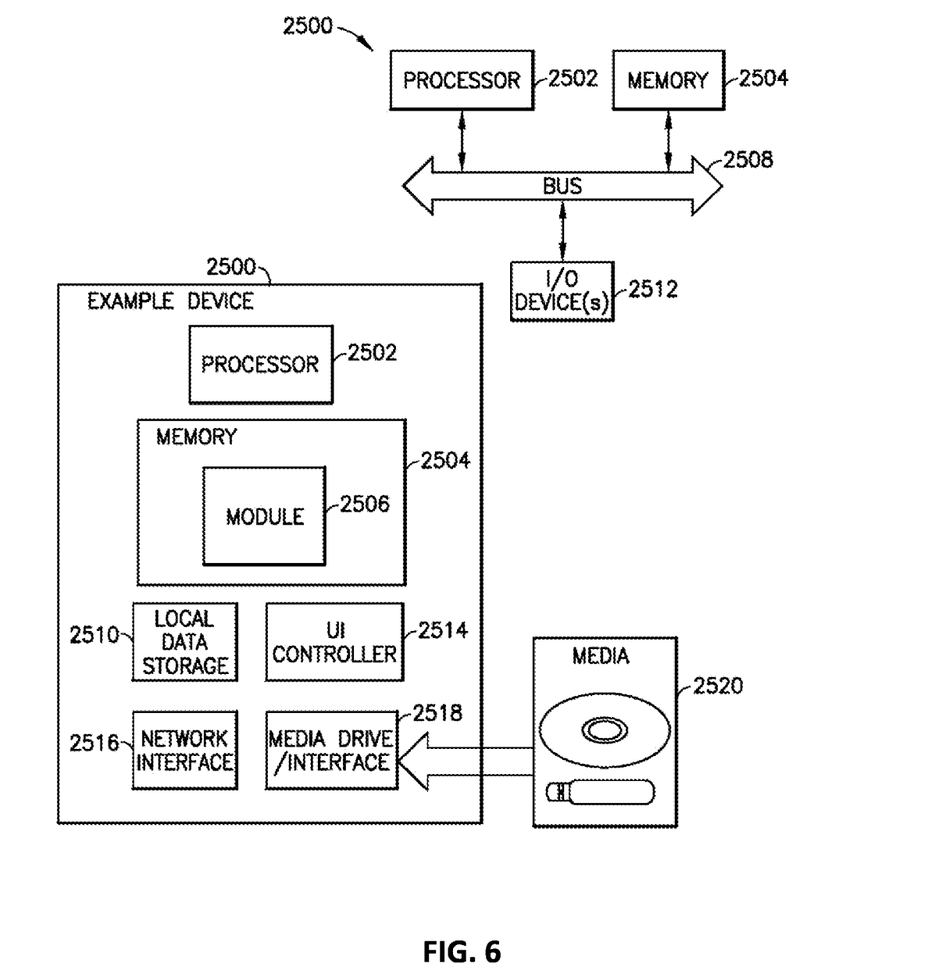
FIG. 6 is a schematic diagram of a computer system.

FIG. 6 illustrates an example device 2500, with a processor 2502 and memory 2504 that can be configured to implement various embodiments of the workflow described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein one or more embodiments of methods and systems that differentiate high gamma ray (GR) clay formations from high GR formations with no-clay or a minimal amount of clays (hot formation rock) and thus provide for improved formation evaluation where potential pay zones due to non-clay high GR reading (such as the so-called hot formation rock, e.g., hot sand, are not missed. The methods and systems can also provide a quantitative estimate of clay volume of formation rock from low frequency electromagnetic (EM) measurements of the formation rock. The methods and systems can also generate gamma ray logs of formation rock from electromagnetic (EM) measurements of the formation rock. In embodiments, the methods and systems of the present disclosure can improve regional geological studies. It will therefore be appreciated by those skilled in the art that yet other modifications could be made to the provided invention without deviating from its spirit and scope as claimed.

What is claimed is:

1. A method of characterizing a subterranean formation comprising:
  disposing a logging tool in a wellbore formed within the subterranean formation;
  operating the logging tool, while the logging tool is in the formation to generate measurement data;
  collecting or obtaining, with the logging tool, electromagnetic measurement data that results from interaction of the electrical signals with a sample of the formation, wherein the sample of the formation comprises formation rock that is disposed adjacent the downhole logging tool during such measurement;
  processing the electromagnetic measurement data to determine data representing permittivity of the sample of the formation; and
  using the data representing permittivity of the sample of the formation to determine first data representing total natural gamma ray flux emanating from the sample of the formation.

2. A method according to claim 1, wherein:
  the first data representing total natural gamma ray flux emanating from the sample of the formation is based on data representing at least one clay type volume fraction contained in the sample of the formation and data representing total natural gamma ray flux for at least one clay type contained in the sample of the formation.

3. A method according to claim 2, wherein:
  the first data representing total natural gamma ray flux emanating from the sample of the formation is calculated according to an equation of the form $$EM\_GR = \frac{\sum_{i=1}^{n} V_{cl,i} GR_i}{\sum_{i=1}^{n} V_{cl,i}},$$

where i ranges from 1 to n representing the clay types contained in the sample of the formation, $V_{cl,i}$ represent volume fraction of each clay type i, and $GR_i$ for each clay type i represents total natural gamma ray flux for the clay type i.

4. A method according to claim 2, wherein:
  the data representing total natural gamma ray flux for the at least one clay type contained in the sample of the formation is obtained through nuclear particles modeling.

5. A method according to claim 2, further comprising:
  identifying the at least one clay type contained in the sample of the formation from the data representing permittivity of the sample of the formation.

6. A method according to claim 2, further comprising:
  using data representing permittivity of the sample of the formation at a predefined low frequency as input to at least one correlation model that outputs data identifying at least one clay type contained in the sample of the formation as well as data representing a corresponding clay type volume fraction contained in the sample of the formation.

7. A method according to claim 6, further comprising:
using data representing permittivity of the rock samples of known clay type and known clay type volume fraction to generate the at least one correlation model.

8. A method according to claim 2, further comprising:
extracting feature data from data representing permittivity of the sample of the formation at varying frequencies, and using the feature data as input to at least one correlation model that outputs data identifying at least one clay type contained in the sample of the formation as well as data representing a corresponding clay type volume fraction contained in the sample of the formation.

9. A method according to claim 1, further comprising:
collecting or obtaining second data representing total natural gamma ray flux detected from the sample of the formation.

10. A method according to claim 9, further comprising:
using the first data representing total natural gamma ray flux emanating from the sample of the formation and the second data representing total natural gamma ray flux detected from the sample of the formation to selectively classify the sample of the formation as belonging to one of a plurality of different types of formation rock.

11. A method according to claim 10, wherein:
the plurality of different types of formation rock include clean formation rock with no shale or clay, formation rock containing shale or clay, and formation rock with no shale or clay or minimal shale or clay but with one or more elemental components common to shale or clay.

12. A method according to claim 11, wherein:
in the case that the sample of the formation is selectively classified as formation rock with no shale or clay or minimal shale or clay but with one or more elemental components common to shale or clay, the first data representing total natural gamma ray flux emanating from the sample is proportional to the amount of clays existing in the sample of the formation.

13. A method according to claim 9, further comprising:
repeating the operations for a plurality of samples of the formation at varying depth to generate and display a log of first data representing total natural gamma ray flux emanating from the formation at varying depth and second data representing total natural gamma ray flux detected from the formation at varying depth.

14. A method according to claim 9, further comprising:
calculating a difference value between the first data representing total natural gamma ray flux emanating from the sample of the formation and the second data representing total natural gamma ray flux detected from the sample of the formation; and
using the difference value to selectively classify the sample of the formation as belonging to formation rock with no shale or minimal shale but with one or more elemental components common to shale.

15. A method according to claim 14, further comprising:
repeating the operations for a plurality of samples of the formation at varying depth to generate and display a log of first data representing total natural gamma ray flux emanating from the formation at varying depth, second data representing total natural gamma ray flux detected from the formation at varying depth, and difference values between the first data and the second data at varying depth.

16. A method according to claim 1, wherein:
the operations of b) involve an inversion process using the electromagnet measurement data of a) to determine the data representing permittivity of the sample of the formation.

17. A method according to claim 9, wherein:
the second data representing total natural gamma ray flux detected from the sample of the formation is measured by operation of a downhole logging tool; and
the sample of the formation comprises formation rock that is disposed adjacent the downhole logging tool during such measurement.

18. The method of claim 1, wherein the evaluation of the formation provides a quantitative estimate of clay volume of formation rock from low frequency electromagnetic measurements of the formation.

19. A method of characterizing a subterranean formation comprising:
obtaining a rock core or plug or other rock sample from the formation;
collecting or obtaining electromagnetic measurement data that results from interaction of electrical signals with the sample from the formation, wherein the electromagnetic measurement data of is measured by operation of a laboratory apparatus or other tool;
processing the electromagnetic measurement data to determine data representing permittivity of the sample of the formation; and
using the data representing permittivity of the sample of the formation to determine first data representing total natural gamma ray flux emanating from the sample of the formation; and
collecting or obtaining second data representing total natural gamma ray flux detected from the sample of the formation.

20. A method according to claim 19, wherein:
the second data representing total natural gamma ray flux detected from the sample of the formation is measured by operation of a laboratory apparatus or other tool.

* * * * *